United States Patent [19]

Azuma

[11] Patent Number: 5,011,094
[45] Date of Patent: Apr. 30, 1991

[54] SHAFT FOR MOUNTING ARTICLE
[75] Inventor: Yoshifumi Azuma, Wakayama, Japan
[73] Assignee: Noritsu Kenkyu Center Co., Ltd., Osaka, Japan
[21] Appl. No.: 24,156
[22] Filed: Mar. 10, 1987
[30] Foreign Application Priority Data
Mar. 10, 1986 [JP] Japan .................................. 61-35154
[51] Int. Cl.$^5$ ............................................ B65H 17/02
[52] U.S. Cl. ............................ 242/72.1; 242/68.3
[58] Field of Search ............. 242/72 R, 72.1, 73, 242/68.2, 110.2, 68.3; 279/2

[56]    References Cited
U.S. PATENT DOCUMENTS

| | | | |
|---|---|---|---|
| 2,922,592 | 1/1960 | Kaltenbach | 242/68.2 |
| 3,721,398 | 3/1973 | Azzalin et al. | 242/72.1 X |
| 3,776,562 | 12/1973 | Gross et al. | 279/2 R |
| 3,791,659 | 2/1974 | Hardin | 279/2 R |
| 3,881,666 | 5/1975 | Greenhalgh | 242/72.1 X |
| 4,148,444 | 4/1979 | Hehner | 242/72.1 X |
| 4,185,526 | 1/1980 | D'Intino | 279/2 R |
| 4,284,251 | 8/1981 | Castillo | 242/72.1 X |
| 4,285,528 | 8/1981 | Neamtu | 279/2 R |

Primary Examiner—Stuart S. Levy
Assistant Examiner—Steven M. duBois
Attorney, Agent, or Firm—Wenderoth, Lind & Ponack

[57]    ABSTRACT

An improved shaft for mounting an article such as a core for roll paper is proposed. The shaft has a core shaft, a boss mounted on the core shaft, and a plurality of sliders mounted in axial grooves formed in the boss. The sliders are slidable axially to a position at which their outer edges extend above the boss surface and are pressed against the inner wall of the center hole of the article to be mounted to securely hold the article.

5 Claims, 1 Drawing Sheet

SHAFT FOR MOUNTING ARTICLE

BACKGROUND OF THE INVENTION

1. Field of the Invention

The present invention relates to a shaft for mounting an article having a center hole. An article mounted on a mounting shaft through a hole formed in the center thereof is likely to move or rock in some direction under the influence of various external forces acting on the article. Such a rocking motion prevents smooth operation.

One example of such a problem will be described with respect to a roll paper mounting shaft for a printer unit of a continuous photo-processing machine. A cylindrical core for roll paper or a cylindrical core of a magazine, which is adapted to contain roll paper and is widely used nowadays in order to obviate an accidental exposure of the paper to light, is mounted on a cantilever mounting shaft fixed to a printer frame. The roll paper mounted on the mounting shaft is pulled out in a long strip during the process of print treatment. Any large deflection, particularly rocking motion, in the axial direction of the mounting shaft is likely to cause a strain to be imparted on or snaking of the roll paper which has a detrimental effect on the printing operation in which high accuracy is required.

2. Description of the Related Art

Various types of mounting shafts have been proposed which are adapted to minimize unexpected rocking of the article mounted on the mounting shaft. A conventional mounting shaft is provided with one or more panel springs extending axially on the surface so that when an article is mounted thereon, the top of the spring will be pressed against the inner wall of the cylindrical core of the article, while the height of the spring above the surface of the shaft is reduced. Another conventional mounting shaft is provided with one or more elastic annular bodies mounted on the periphery of the shaft and a tapered member adapted to be forced in between the elastic annular bodies and the mounting shaft so that the former will be radially expanded and pressed against the inner wall of the cylindrical core of the article to support it.

The former prior art mounting shaft has an advantage that its mechanism is simple. But, because of a high elastic force exerted by the arcuate springs, considerable power is needed when mounting the article on and dismounting the article from the mounting shaft, thus imposing a great deal of load on the article locally. If, for example, the roll paper to be printed is mounted on the former prior art mounting shaft, the roll paper wound around a core in a cylindrical shaft is liable to be telescoped since the roll paper is pressed against the mounting shaft locally, thus causing a slight change of position of the roll paper with time. On the other hand, with the latter prior art mounting shaft provided with the expandable elastic annular bodies around its periphery, a fine adjustment is required according to any error in the inner diameter of the cylindrical core of article. Consequently, it is difficult to expect versatility from this type of mounting shaft. Furthermore, on account of a great number of components being required and its complicated mechanism, the mounting shaft could easily malfunction and could be costly. Still further, since the area of contact between the elastic bodies and the core of the article is relatively small, it is difficult to reliably eliminate the axial deflection of the article.

SUMMARY OF THE INVENTION

An object of the present invention is to provide a shaft for mounting various kinds of articles with which mounting and dismounting of all article are easy and are possible without excessive loading which may cause deformation of the article, and which is mechanically simple and meets wide-ranging requirements for a shaft for mounting an article.

The mounting shaft according to the present invention is adapted so that a plurality of panel sliders protrude above the boss surface with outside edges kept thereof maintained parallel with the boss surface so as to be pressed against the inner wall of the cylindrical core of the article over a wide area. Therefore, the article is reliably held on the mounting shaft without causing rocking in any direction. This is specifically desirable for equipment where rocking motion during operation has to be suppressed to a minimum.

When locking, since an article such as roll paper can only be moved in one direction and pressed against a wall in a predetermined position, precise positioning of the roll paper is accomplished. Since the knob threadedly engaging the shaft is used as a back-up member, a large locking force is obtainable with a little force. Furthermore, no specific adjustment is required even if there is any error in the inner diameter of the cylindrical core of an article. Thus, articles can always be secured to the mounting shaft reliably without being affected much by the error.

Even when an article such as roll paper is mounted on the shaft in an offhand manner, the roll paper can be set at a correct position without fail. The dismounting operation of the article is as simple and easy as the mounting operation. It is possible to provide a highly useful and inexpensive mounting shaft because of its simple construction.

BRIEF DESCRIPTION OF THE DRAWINGS

Other features and objects of the present invention will become apparent from the following description taken with reference to the accompanying drawings, in which.

DESCRIPTION OF THE PREFERRED EMBODIMENT

Figure 1:
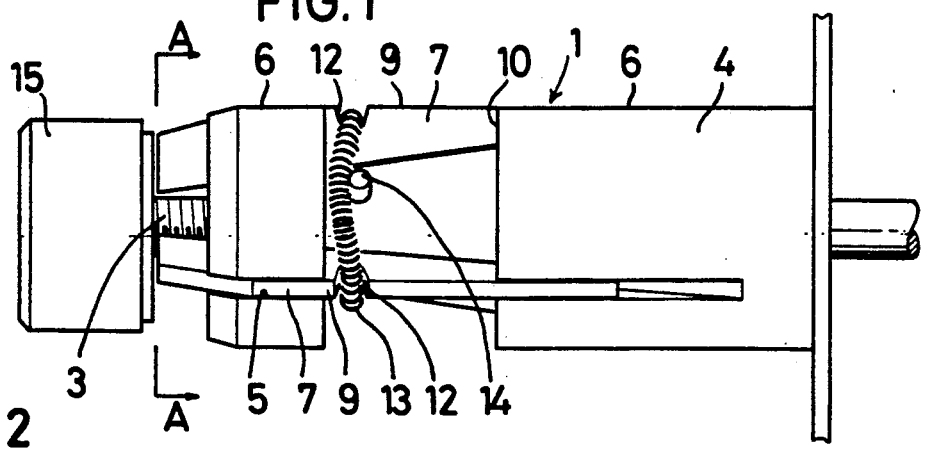
FIG. 1 is a front view of a mounting shaft in accordance with the present invention.
Figure 2:
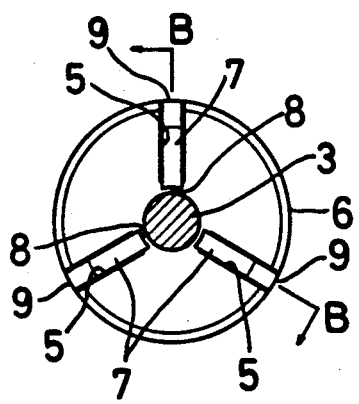
FIG. 2 is a sectional view taken along line A—A of FIG. 1.
Figure 3:
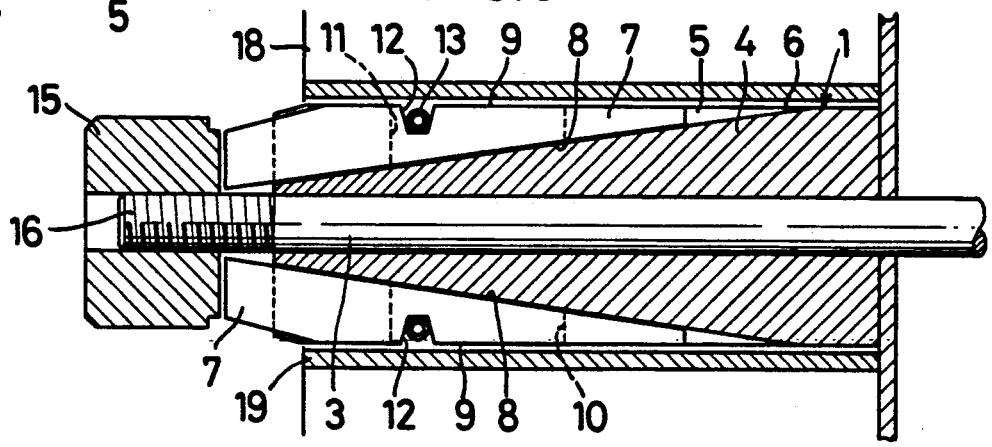
FIG. 3 is a sectional view taken along line B—B of FIG. 2 showing the mounting shaft in an unlocked condition.
Figure 4:
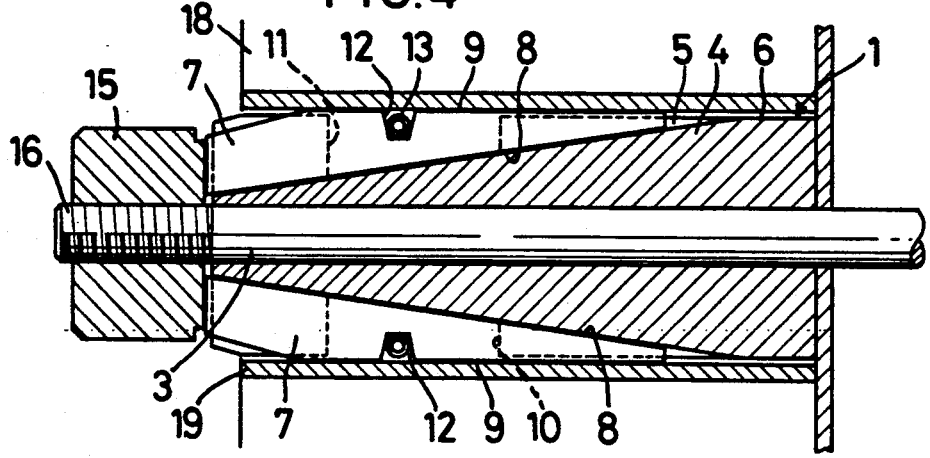
FIG. 4 is a view similar to FIG. 3 but showing the same in a locked condition.

Referring to the drawings, numeral 1 designates a mounting shaft for mounting an article, in accordance with the present invention. It comprises a core shaft 3 having its one end secured to, e.g., the frame of a printer unit of a continuous processing machine (not shown) and an elongated, large-diameter boss 4 concentrically mounted on and secured to the core shaft 3. The boss 4 is formed with three grooves 5 equally angularly spaced and extending in the axial direction of the boss over substantially the whole length thereof with their bottom surface tapered. A panel slider 7 having an elongated triangular shape is received in each groove 5. The sliders 7 are adapted to slide along the tapered grooves 5, and are guided thereby. When the sliders 7 are pushed rightwardly in FIGS. 1 and 3, the outside edge 9 of each slider 7 will be raised above the boss surface 6, and will be maintained parallel while the boss surface 6 with the bottom edge 8 slides on the tapered bottom surface of each groove 5. The boss 4 is formed with an annular wide groove extending from at 10 to 11 in an axial direction. Each slider 7 is formed with a notch 12 in its outside edge at a portion disposed in the annular groove 10. A ring spring 13 is mounted around the boss 4 in the notches 12 of the sliders 7. The notches 12 are deep enough to receive the ring spring 13 snugly therein without the spring protruding above the outside edges 9 of the sliders 7. The ring spring 13 is stretched by engagement with one or more stoppers 14 embedded in the annular groove 10 and urges each slider 7 in such a direction as to push it down the tapered bottom edge of each groove 5, i.e. to the lefthand side in FIGS. 1 and 3, retracting the outside edge of each slider below the boss surface 6. A member for pushing the sliders 7 forward, e.g., a knob 15 is provided at the end of the sliders 7. The knob may have the same diameter as or a smaller diameter than that of the boss 4. The knob 15 is in threaded engagement with a threaded portion 16 formed at one end of the shaft 3. As the knob 15 is turned, the sliders 7 are pushed to the righthand side in FIG. 3 against the elastic force of the ring spring 13, gradually protruding above the boss surface 6.

These outside edges 9 of the sliders 7 protruding above the boss surface 6 are pressed against the inner wall of an article such as a cylindrical core 19 around which a web of roll paper 18 to be printed is wound, and which is mounted beforehand on the mounting shaft 1. This reliably secures the article on the mounting shaft 1 so that it will neither move nor rock in any direction.

What are claimed are:

1. A device for supporting an article having a center hole, said device comprising:
    a core shaft;
    a boss concentrically mounted on and secured to said core shaft and extending in an axial direction thereon, said boss having a plurality of grooves each of which extends in and is tapered in said axial direction, and said grooves being spaced from one another around said boss;
    a plurality of sliders for fixing the article relative to said core shaft and each of which is slidably mounted and guided in a respective one of said grooves, each of the sliders having a bottom edge contacting said boss at the bottom of the respective said groove in which it is mounted and a top edge opposite the bottom edge, each of the sliders movable in said axial direction along the respective said groove in which it is mounted between a first position at which the top edge thereof is disposed below the outer circumferential surface of said boss and a second position at which the top edge thereof protrudes radially outward from the outer circumferential surface of said boss;
    urging means for exerting a biasing force in a direction opposite to said axial direction that biases said sliders toward said first position; and
    a rotatable knob disposed at one end of said core shaft and abutting each of said sliders for moving each of said sliders from said first position to said second position, and said knob being movable along and fixable relative to said core shaft for adjustably maintaining said sliders in respective fixed positions against the biasing force exerted by said urging means.

2. A device as claimed in claim 1, wherein each of said bottom edges of the sliders extends generally parallel to the surface of the boss at the bottom of the respective said groove in which it is mounted as the sliders are moved from said first position to said second position, and each of said top edges is flat and extends in said axial direction so that the top edges always extend in said axial direction as said sliders are moved in said axial direction.

3. A device for supporting an article having a center hole, said device comprising:
    a core shaft;
    a boss concentrically mounted on and secured to said core shaft and extending in an axial direction thereon, said boss having a plurality of grooves each of which extends in and is tapered in said axial direction, and said grooves being spaced from one another around said boss;
    a plurality of sliders for fixing the article relative to said core shaft and each of which is slidably mounted and guided in a respective one of said grooves, each of the sliders having a bottom edge contacting said boss at the bottom of the respective said groove in which it is mounted and a top edge opposite the bottom edge, each of the sliders movable in said axial direction along the respective said groove in which it is mounted between a first position at which the top edge thereof is disposed below the outer circumferential surface of said boss and a second position at which the top edge thereof protrudes radially outward from the outer circumferential surface of said boss;
    urging means for exerting a biasing force in a direction opposite to said axial direction that biases said sliders toward said first position, said urging means comprising a ring spring extending around said sliders, and a stopper projecting from said boss and engaging said ring spring; and
    slider support means disposed at one end of said core shaft and contacting said sliders for adjustably maintaining said sliders in respective fixed positions against the biasing force exerted by said urging means.

4. A device as claimed in claim 3, wherein each of said bottom edges of the sliders extends generally parallel to the surface of the boss at the bottom of the respective said groove in which it is mounted as the sliders are moved from said first position to said second position, and each of said top edges is flat and extends in said axial direction so that the top edges always extend in said axial direction as said sliders are moved in said axial direction.

5. A device as claimed in claim 2, wherein said stopper abuts said ring spring and is disposed in said axial direction from said ring spring.

* * * * *